L. J. TETLOW.
TROLLEY WHEEL.
APPLICATION FILED AUG. 16, 1911.
1,044,293.
Patented Nov. 12, 1912.
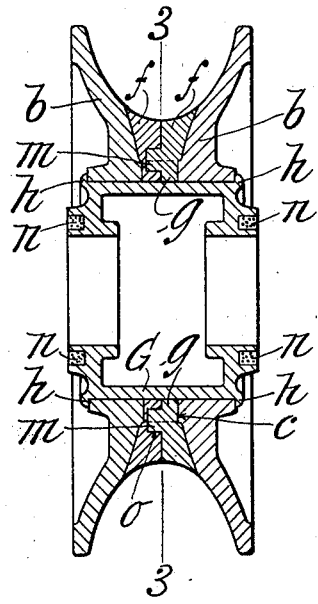
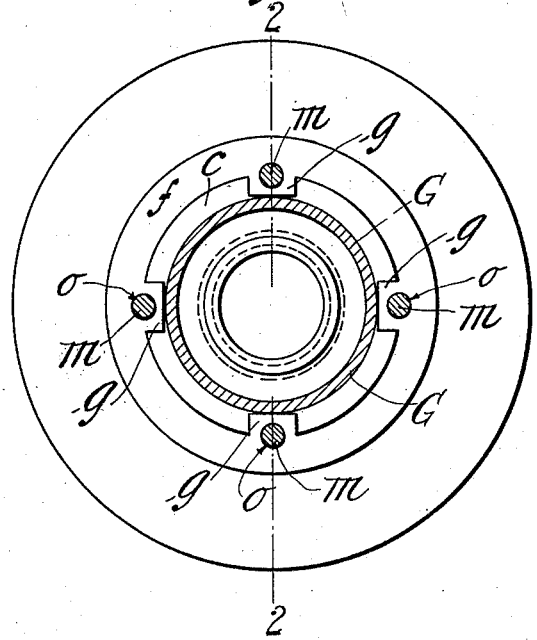
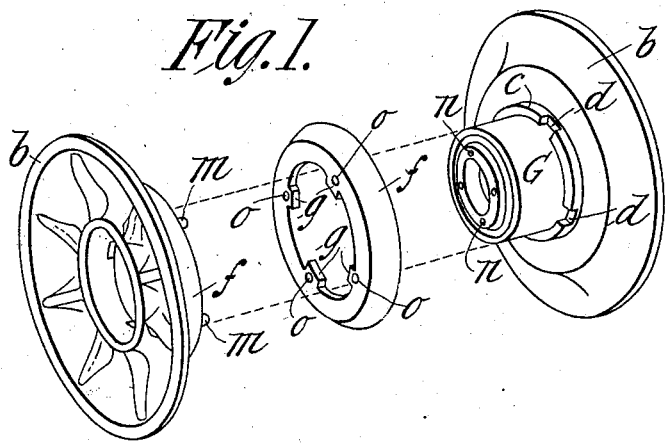
WITNESSES:
INVENTOR,
Lewis J. Tetlow,
BY
ATTORNEY.

UNITED STATES PATENT OFFICE.

LEWIS J. TETLOW, OF WEST SPRINGFIELD, MASSACHUSETTS.

TROLLEY-WHEEL.

1,044,293.  Specification of Letters Patent.  Patented Nov. 12, 1912.

Application filed August 16, 1911. Serial No. 644,376.

*To all whom it may concern:*

Be it known that I, LEWIS J. TETLOW, a citizen of the United States of America, and resident of West Springfield, in the county of Hampden and State of Massachusetts, have invented certain new and useful Improvements in Trolley-Wheels, of which the following is a full, clear, and exact description.

The object of this invention is to provide a construction of trolley wheel which while comprising a sufficient portion of brazen material for the running contact on the wire is for the greater part composed of a very much cheaper metal such, for instance, as malleable iron,—regard being had to certain particular mode of combination of the parts for quick and practicable construction, and for the interchange or replacement of some of the parts without necessarily discarding the whole wheel.

The invention is described in conjunction with the accompanying drawings and set forth in the claims.

In the drawings:—Figure 1 is a perspective view showing the sectionally made portions of the trolley wheel. Fig. 2 is a sectional view through the wheel on the plane of its axis. Fig. 3 is a sectional view centrally through the wheel at right angles to its axis.

The trolley wheel consists of a separate pair of opposed malleable iron annular cheek members $b$ $b$ having flanges $c$ extending transversely inwardly from their inner side faces, said flanges being provided with recesses $d$ therein, and opening from the ends thereof, as clearly shown in Fig. 1.

$f$ $f$ represent a pair of ring sections of brazen metal which conform facewise, at their outer sides to the inner side faces of the cheek members and which fit about the flanges $c$ $c$ of the opposite and suitably separated cheek members and have radially inwardly extending projections or lugs $g$ $g$ which fit and engage in the recesses $d$ of the cheek members and may be connected therein by brazing. The inner faces of the flanges $c$ $c$ and of the ring sections $f$ $f$ are in a coinciding plane, all with each other, which plane is the median plane of the trolley wheel transversely of its axis. The ring sections $f$ $f$ of brass, bronze or composition in which brass is a component, not only have interlocking engagements as described with the cheek members $b$ $b$, but they are preferably interlocked with each other, as by bosses or teats $m$ $m$, provided on the inner face of one ring section and extending parallel with the axis and which engage in depressions or sockets $o$ correspondingly located in the other ring section for the engagement of such teats or bosses therein. Thus all liability of the ring sections to creep around is avoided, even if by any possibility one of the cheek members might have a rotative movement relatively to the opposite cheek member.

The two cheek members having the ring sections engaged thereon and brazed thereto are placed together in the relations shown in Figs. 1 and 3; and the hub G is inserted through them. The hub is somewhat longer than the width through the hub portion of the wheel body which is constituted by the united cheek and ring sections and tightly fits therethrough; and by proper mechanical operation involving the employment of a press having suitable dies the end portions of the hub are upset as shown at $h$ $h$, in Fig. 1, for overlapping engagements upon the outer side faces of the cheek members so that the sectional members of which the wheel is composed are all securely united. The upsetting for the above described overlapped engagement which in the sectional views is indicated at $h$, may be either circularly continuous or only at intervals around the outer edges of the hub.

The manner of making up the body of the wheel sectionally as described is one conducing to cheapness and practicability of rapid construction inasmuch as metals may be used of such hardness as to be difficult of finishing and which by reason of the necessity of but very little surfacing or machine finishing may be united for the production of a very satisfactory and efficient wheel.

The hub has a plurality of grease pockets $n$ in its ends so that the end faces of the trolley wheel at its hub portion may by the supplying of grease in said pockets be lubricated for preventing undue friction between the wheel and the contact springs.

I claim:—

1. A trolley wheel consisting of a separate pair of opposed iron annular cheek members having transversely inwardly extending recessed flanges marginally of the openings therethrough, a pair of ring sections of brazen metal, having radially inward projections engaging in said recesses of the cheek members and a hub extending through the said cheek members and ring sections, and means for confining the said cheek members and ring sections on the hub, the end portions of which are upset for overlapping engagements with the opposite outer side faces of the cheek members.

2. A trolley wheel consisting of a separate pair of opposed iron annular cheek members having transversely inwardly extending recessed flanges marginally of the openings therethrough, a pair of ring sections of brazen metal, having radially inward projections engaging in said recesses of the cheek members and a hub extending through the said cheek members and ring sections, the end portions of which are upset for overlapping engagements with the opposite outer side faces of the cheek members.

3. A trolley wheel consisting of a separate pair of opposed iron annular cheek members having transversely inwardly extending recessed flanges marginally of the openings therethrough, a pair of ring sections of brazen metal adapted to surround the said recessed flanges and having radially inward projections engaging in the recesses of said flanges, and said ring sections being interlocked with each other, a hub extending through the said cheek members and ring sections, and means at the ends of the hub for tightly securing the hub and cheek members against relative displacement.

4. A trolley wheel consisting of a separate pair of opposed iron annular cheek members having transversely inwardly extending recessed flanges marginally of the openings therethrough, a pair of ring sections of brazen metal surrounding said flanges and in sidewise contact against the cheeks, and having radially inward projections engaging in said recesses of the cheek members and connected therein by brazing, and a hub extending through the said cheek members and ring sections, the end portions of which are upset for overlapping engagements with the opposite outer side faces of the cheek members.

5. A trolley wheel consisting of a separate pair of opposed iron annular cheek members having transversely inwardly extending recessed flanges marginally of the openings therethrough, a pair of ring sections of brazen metal, surrounding said flanges and in sidewise contact against the cheeks, and having radially inward projections engaging in said recesses of the cheek members and connected therein by brazing and a hub extending through the said cheek members and ring sections, the end portions of which are upset for overlapping engagements with the opposite outer side faces of the cheek members, and having grease cavities in its opposite ends.

6. In a trolley wheel, a pair of separate opposed iron annular cheek members, one having a transversely inwardly extending flange marginally of the opening therethrough, a ring of brazen metal between, and having an interlocking engagement with said cheek members, an annular hub extending through the ring and cheek members, and having, appurtenant thereto, means for the confinement of all the parts tightly together.

Signed by me at Springfield, Mass., in presence of two subscribing witnesses.

LEWIS J. TETLOW.

Witnesses:
G. R. DRISCOLL,
W. A. STANNARD.

Copies of this patent may be obtained for five cents each, by addressing the "Commissioner of Patents, Washington, D. C."